Oct. 5, 1971  R. G. TANNER  3,610,069
MOLDED ONE-PIECE BALANCING RING
Filed Nov. 14, 1969  2 Sheets-Sheet 2
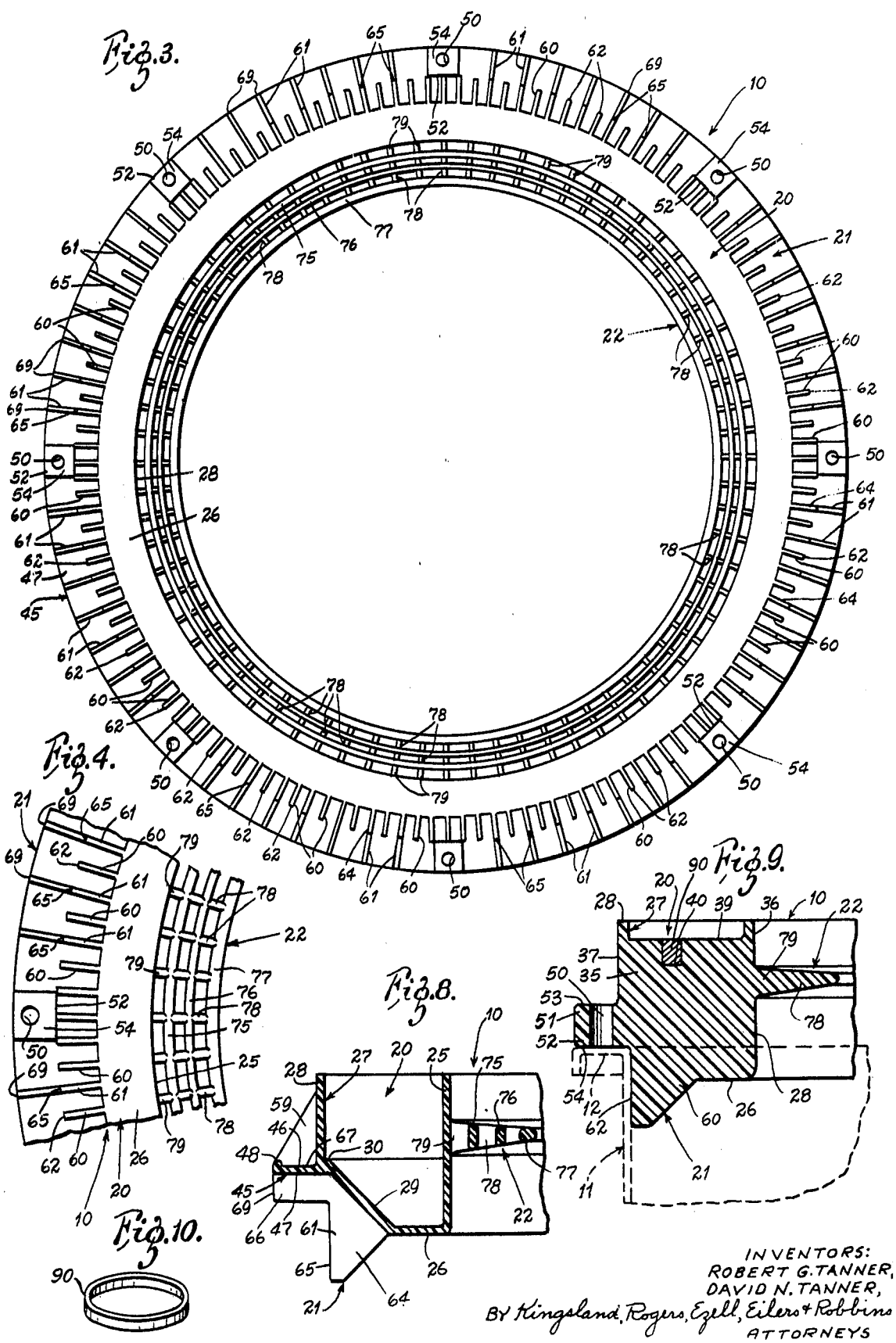
INVENTORS:
ROBERT G. TANNER,
DAVID N. TANNER,
BY Kingsland, Rogers, Ezell, Eilers & Robbins
ATTORNEYS United States Patent Office 3,610,069
Patented Oct. 5, 1971

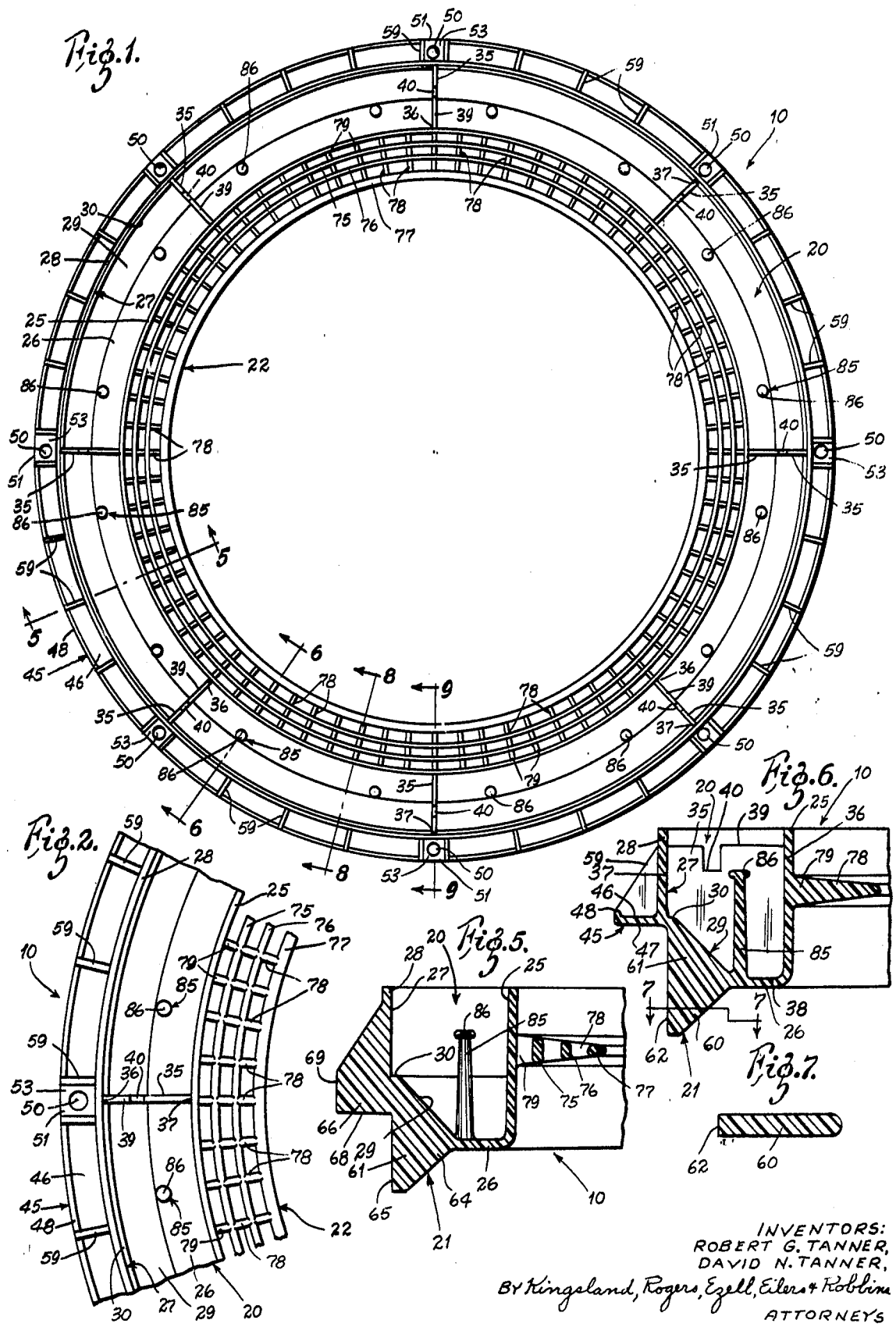

3,610,069
MOLDED ONE-PIECE BALANCING RING
Robert G. Tanner, St. Charles, and David N. Tanner, Kirkwood, Mo., assignors to Arundale Manufacturers, Inc., St. Louis, Mo.
Filed Nov. 14, 1969, Ser. No. 876,651
Int. Cl. F16f 15/22
U.S. Cl. 74—573      18 Claims

ABSTRACT OF THE DISCLOSURE

A balancing ring for use in balancing the tub of a washing machine having a channel portion for receiving a weighting material and a vertical grill extending downward from the channel portion which allows liquid to pass, but not the articles being washed. The entire balancing ring is molded as one piece. Means are also provided for mounting the balancing ring to the tub.

BACKGROUND OF THE INVENTION

Balancing rings are used on automatic washing machines to balance the tub of the washer during its rotation. The balance is especially critical during the spin cycle when the tub is traveling at high r.p.m.

The problem is caused where heavy articles such as towels accumulate on one side of the tub and relatively light articles on the other. The result is an unbalance in the tub which at high r.p.m. results in excessive noise and vibration and wearing of parts. To minimize the effect of the unbalanced load, a balancing ring is mounted to the top of the tub.

In addition to the problem of balancing the tub there is also the problem of preventing the articles being washed from escaping over the top of the balancing ring caused by centrifugal forces acting on the articles at a high rate of revolution. At high r.p.m. the articles will tend to rise up on the side and over the top of the tub or ring.

One common type of balancing ring known to the art comprises a stamped metal rim and frame. A cast iron ring used as the weight is bolted to the frame. A horizontal metal grill in the form of a ring is fastened to the inside of the metal frame to prevent the articles being washed from escaping over the top of the balancing ring, and a vertical metal grill in the form of a ring is bolted to the frame to prevent clothing from passing over the top of the tub. Hence, it can be seen that this type of balancing ring requires the manufacture and assembly of four distinct parts: The frame, the cast iron weight, the horizontal grill, and the vertical grill.

Another type of balancing ring known to the art consists of a stamped metal trough into which concrete is poured, the concrete being used as the weighting material. The horizontal and vertical grills are manufactured separately and then attached to the metal trough just as in the other type described above.

As will be seen the balancing ring of this invention is of one-piece construction eliminating costly manufacture and assembly time, and can be made of a relatively light, inexpensive and easy to work material such as plastic.

SUMMARY OF THE INVENTION

The balancing ring of this invention is molded in one piece from a material such as plastic. It includes a channel portion into which a weighting material such as concrete is poured. A vertical grill comprised of vertical fins extends downward from the bottom of the channel portion to prevent articles being washed from escaping, but allowing liquids such as water and detergent to pass over the top of the tub. A horizontal retainer is provided which extends inward from the inner wall of the channel portion to prevent the articles from escaping over the top of the balancing ring. Means are provided for mounting the balancing ring to the tub. This mounting means includes a flange extending outward from the channel portion, the bottom of the flange combining with the vertical fins to define a surface upon which the top of the tub rests. Each of the vertical fins may also be shaped with an outside vertical edge which is positioned in close proximity to the inside of the tub wall when the balacing ring is mounted to the tub.

Reinforcing ribs may also be provided between the outside wall of the channel portion and the flange as well as separating ribs within the channel to separate the inner and outer walls of the channel. Where concrete or another similar type of weighting material is used, it may be desirable to provide holding studs extending upward from the bottom of the channel to hold the weighting material in the channel during shipping and handling. Also, slots may be provided in the separating ribs to receive a retaining band or wire to assist in holding the weighting material together during high r.p.m.

All of these features of the invention are molded as a part of a one-piece balancing ring. No assembly is required. It is only necessary to pour the weighting material into the channel and mount the ring to the tub.

BRIEF DESCRIPTION OF THE DRAWINGS

FIG. 1 is a top plan view of the balancing ring of this invention, without the reinforcing band;

FIG. 2 is a fragmentary view on an enlarged scale of the invention as shown in FIG. 1;

FIG. 3 is a bottom view of the invention as shown in FIG. 1;

FIG. 4 is a fragmentary view on an enlarged scale of the invention as shown in FIG. 3;

FIG. 5 is a view in section taken along the line 5—5 of FIG. 1;

FIG. 6 is a view in section taken along the line 6—6 of FIG. 1;

FIG. 7 is a view in section taken along the line 7—7 of FIG. 6;

FIG. 8 is a view in section taken along the line 8—8 of FIG. 1;

FIG. 9 is a view in section taken along the line 9—9 of FIG. 1, but including the reinforcing band; and FIG. 10 is an isometric view on a reduced scale of the reinforcing band of this invention.

DESCRIPTION OF THE PREFERRED EMBODIMENTS

There is shown in the drawing a molded, one-piece balancing ring 10 and a washing machine tub 11 (FIG. 9). The washing machine tub 11 has a top flange 12 to which the balancing ring 10 is mounted by any suitable means such as with a plurality of nut and bolt assemblies (not shown). The balancing ring of this embodiment is molded of plastic, although other suitable materials could be used. The balancing ring 10 has a channel portion 20, a vertical grill 21 and a horizontal retainer such as a grill 22. The channel portion 20 has a vertical inner wall 25, a horizontal bottom wall 26, and an outer wall 27. The outer wall 27 has an upper vertical portion 28 and a lower inclined portion 29. The bottom of the upper vertical portion 28 and the top of the lower inclined portion 29 are joined by a substantially horizontal portion 30.

A plurality of separating ribs 35 are spaced around the ring 10 within the channel portion 20. The ribs 35 have side edges 36 and 37, a bottom edge 38 and a top edge 39. Located in the top edge 39 of each of the ribs 35, is a slot 40 of general U-shape cross-section. The side edges 36 and 37 and the bottom edge 38 of the rib 35 conforms to the contour of the inner wall 25, the outer wall 27, and the bottom wall 26 respectively of the channel portion 20.

Extending outwardly from and attached to the outer wall 27 of the channel portion 20 at the bottom of the upper vertical portion 28 is a horizontal flange 45. The flange 45 has a top surface 46, bottom surface 47, and, extending around the outer edge of the flange 45, a lip 48. A plurality of bores 50 are equally spaced around the ring and through the flange 45. The flange 45, where each of the vertical bores is located, is substantially thicker than the remaining portions of the flange 45. The purpose of the additional thickness is to provide added strength where the ring 10 is bolted to the tub 11. Hence, at each of the vertical bores the flange 45 is thickened on its top 46 with additional molded material 51 and on its bottom 47 with additional molded material 52. The top surface of the molten material 51 is even with the top of the lip 48 forming a horizontally flat surface 53 (FIG. 9). The bottom molded material 52 is likewise formed with a bottom horizontally flat surface 54.

A plurality of re-enforcing ribs 59 having generally triangular shaped cross-sections are spaced around the ring 10 between the upper surface 46 of the flange 45 and the upper vertical portion 28 of the outside wall 27 of the channel portion 20. The re-enforcing ribs 59 are located on each side of the bores 50, as well as at other locations around the ring, with enough space between the re-enforcing ribs 59 to accommodate the head of a nut and bolt assembly.

The vertical grill 21 is comprised of a plurality of vertical ribs 60 alternately spaced with a plurality of vertical ribs 61, each extending downward from the inclined portion 29 of the outside wall 27 of the channel portion 20. The vertical ribs 60 and 61 are sufficiently close together to prevent clothing or other articles being washed from passing through, but sufficiently far enough apart to allow liquid such as water to pass through. Thus, during the spin cycle of the wash, the water centrifically forced out of the clothes can pass through the vertical ribs 60 and 61 and over the top of the tub, but not the articles being washed. The ribs 60 are generally triangular in cross-section, and have an outward vertical edge 62 as shown in the drawing. The ribs 61, like the ribs 60 have a triangular cross-sectional portion 64 and an outward vertical edge 65, but also have a horizontal portion 66 extending outwardly from the outward vertical edge 65. The horizontal portion 66 of the rib 61 has a top 67 which conforms to the bottom 47 of the flange 45 and is molded as a part of the flange 45. The horizontal portion 66 has an outward edge 69, which is flush with the outward edge of the flange 45, and a bottom edge 68. The horizontal portion 66 is the same thickness as the lower molded portion 52 at the bores 50. Hence, the bottom edges 68 of the horizontal portions 66 of the ribs 61 and the bottom surface of the lower molten portion 52 of the flange 45 together with the vertical edges 62 and 65 of the ribs 60 and 61 respectively, form an L-shape seat to which the tub 11 may be bolted.

The horizontal grill 22 extends inward from the inner wall 25 of the channel portion 20 and is molded to the wall 25 about ⅓ of the way from the top of the channel portion 20. The purpose of the horizontal grill 22 is to prevent the clothes or other articles being washed from passing up through and over the top of the ring 10. Thus, during the spin cycle where the clothes have a tendency to rise up in the tub, the horizontal grill 22 will hold the clothes in the tub. The horizontal grill 22 is comprised of a plurality of rings 75, 76 and 77. The ring 77 is the thickest and outermost ring, the ring 75 is the thinnest and innermost ring, and the ring 76 located in the middle, has a thickness somewhere between the rings 75 and 77. The rings 75, 76, and 77 are joined by a plurality of triangular shaped ribs 78. The ribs 78 have a wide end portion 79 molded to the inner wall 25 of the channel portion 20. The rings 75, 76 and 77 and the plurality of ribs 78 combine to give a general grading appearance to the horizontal grill 22.

Where concrete or like material is to be used as the weighted material it is desirable to provide a means for holding the concrete in the channel portion 20 of the ring 10 when the ring 10 is in the inverted position. This is easily accomplished with a plurality of studs 85 extending upward from the bottom wall 26 of the channel portion 20. The studs 85 have heads 86 which hold the concrete and prevent it from falling out of the channeled portion 20 during shipping or handling of the ring.

The slots 40 in the separating ribs 35 described above are provided to receive a continuous re-enforcing band or wire 90 where a weighting material such as concrete is used. The re-enforcing band 90 will assist the plastic ring in preventing the concrete from flying apart at high r.p.m. such as during the spin cycle.

Hence, in operation a re-enforcing band 90 is inserted in the slots 40 and a weighting material such as concrete is poured or packed into the channel portion 20. The ring 10 is then bolted or otherwise fastened to the tub 11.

While the balancing ring has been described in the conventional piece-by-piece way, it must be remembered that there is only one piece involved, and that is the ring 10 in its entirety. The ring 10, including the channel portion 20, the vertical grill 21, horizontal grill 22, the re-enforcing ribs 60, the separating ribs 35, the flange 45 and the studs 85 is molded in one piece. None of the elements forming the balancing ring need be assembled.

Various changes and modifications may be made within this invention as will be readily apparent to those skilled in the art. Such changes and modifications are within the scope and teaching of this invention as defined by the claims appended hereto.

What is claimed is:

1. A balancing ring for use in balancing the tub of a washing machine comprising a channel portion for receiving weighting material, a number of vertical, radially aligned fins of generally triangular shape spaced around the ring and extending from the bottom of the channel portion to form a grill which allows liquid to pass, but not articles being washed, the channel portion and the vertical grill molded together as a one-piece balancing ring, and means for mounting the balancing ring to the tub.

2. The balancing ring of claim 1 including a horizontal retainer extending inward from the inside wall of the channel portion, the channel portion, the vertical grill, and the horizontal retainer molded together as a one-piece balancing ring.

3. The balancing ring of claim 2 wherein the horizontal retainer is a horizontal grill.

4. A balancing ring for use in balancing the tub of a washing machine comprising a channel portion for receiving weighting material, a vertical grill extending from the bottom of the channel portion, a horizontal retainer extending inward from the inside wall of the channel portion, the horizontal retainer including a plurality of rings, each having a different diameter, and a plurality of ribs spacing the rings from one another, the channel portion, the vertical grill, and the horizontal retainer molded together as a one-piece balancing ring, and means for mounting the balancing ring to the tub.

5. A balancing ring for use in balancing the tub of a washing machine comprising a channel portion for receiving weighting material, a number of vertical fins spaced around the ring and extending from the bottom of the channel portion to form a grill which allows liquid to pass through the grill but not articles being washed, a horizontal flange extending outward from the outer walls of the channel portion, the flange having a plurality of holes spaced around the balancing ring for mounting the ring to the tub, the channel portion, the vertical grill, and the flange molded together as a one-piece balancing ring.

6. The balancing ring of claim 5 wherein the flange portions where the holes are located are thicker than the other portions of the flange and at least some of the vertical fins have a horizontal portion extending outward along the bottom of the flange, the horizontal portion having a bottom edge which is horizontal and which combines with the bottom of the thickened portion of the flange to form a surface on which the tub is mounted.

7. The balancing ring of claim 6 wherein each vertical fin has an outside vertical edge which is in close proximity to the inside of the tub wall when the balancing ring is mounted on the tub.

8. A balancing ring for use in balancing the tub of a washing machine comprising a channel portion for receiving weighting material, a vertical grill extending from the bottom of the channel portion, a horizontal flange extending outwardly from the outer wall of the channel portion to provide means for mounting the balancing ring to the tub, the channel portion, the vertical grill, and the flange molded together as a one-piece balancing ring.

9. The balancing ring of claim 8 including a plurality of reinforcing ribs molded as a part of the rest of the balancing ring between the flange and the outer wall of the channel portion.

10. The balancing ring of claim 1 including a plurality of separating ribs molded as a part of the rest of the balancing ring and located in the channel portion for spacing the inner wall of the channel from the outer wall of the channel.

11. The method of balancing the tub of a washing machine comprising molding a one-piece balancing ring with a channel portion, a vertical grill extending from the bottom of the channel portion, and a horizontal retainer extending inward from the inner wall of the channel portion, pouring a weighting material in the channel portion, and mounting the balancing ring to the top of the tub with the vertical grill extending downward inside the tub.

12. The method of claim 11 wherein between the molding step and pouring step there is included the step of inserting a retaining band in the channel portion.

13. A balancing ring for use in balancing the tub of a washing machine comprising a channel portion for receiving weighting material, a plurality of separating ribs located in the channel portion for spacing the inner wall of the channel from the outer wall of the channel, the separating ribs having slots of general U-shaped cross section located in the top edge of the ribs for receiving a retaining band, and a vertical grill extending from the bottom of the channel portion, the channel portion, vertical grill and separating ribs molded together as a one-piece balancing ring.

14. A balancing ring for use in balancing the tub of a washing machine comprising a channel portion for receiving weighting material, a vertical grill extending from the bottom of the channel portion, and a plurality of studs extending upwardly from the bottom of the channel portion, the head of the stud being of a larger diameter than its shank, the channel portion, vertical grill, and studs being molded together as a one-piece balancing ring.

15. A balancing ring for use in balancing the tub of a washing machine comprising a channel portion for receiving weighting material, a vertical grill extending from the bottom of the channel portion, and a horizontal retainer extending inward from the inside wall of the channel portion, the channel portion, the vertical grill and the horizontal retainer molded together as a one-piece balancing ring.

16. The balancing ring of claim 15 wherein the horizontal retainer includes a plurality of rings, each having a different diameter, and a plurality of ribs spacing the rings from one another, the ribs being molded as part of the rings and the rest of the balancing ring, and means for mounting the balancing ring to the tub.

17. A balancing ring for use in balancing the tub of a washing machine comprising a generally U-shaped portion, a horizontal retainer extending inward from the inside wall of the U-shaped portion, the U-shaped portion and horizontal retainer being molded together as a one-piece balancing ring, and means for mounting the balancing ring to the tub.

18. The balancing ring of claim 17 wherein the generally U-shaped portion is substantially entirely hollow and open at the top for receiving weighting material, and including a plurality of thin, wafer-like separating ribs molded as part of the rest of the balancing ring and located in the U-shaped portion for spacing its inner wall from its outer wall.

References Cited

UNITED STATES PATENTS

| | | | |
|---|---|---|---|
| 3,278,037 | 10/1966 | Stelli et al. | 210—363 |
| 3,334,497 | 8/1967 | Waldrop | 68—23.3 |

WILLIAM F. O'DEA, Primary Examiner

F. D. SHOEMAKER, Assistant Examiner

U.S. Cl. X.R.

68—23.3; 210—363